No. 748,096. PATENTED DEC. 29, 1903.
T. PICKLES & B. BLAKEY.
WEFT FORK.
APPLICATION FILED MAR. 6, 1903.
NO MODEL.
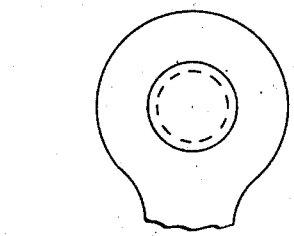
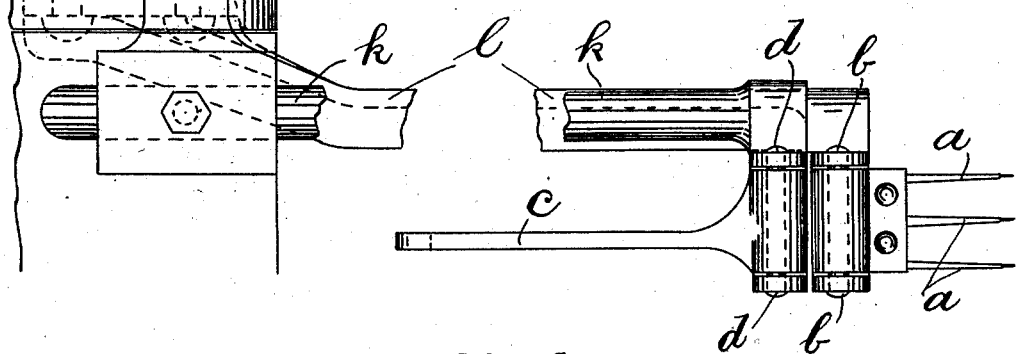
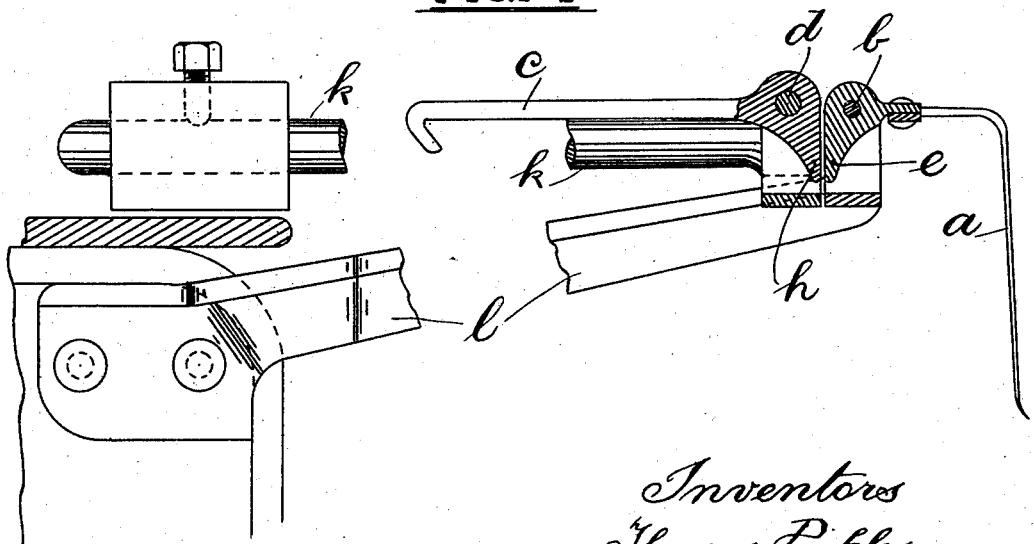
Witnesses
Arthur Gadd.
George Frederick Gadd.
Inventors
Thomas Pickles
and
Benjamin Blakey
Per: William Gadd.
Attorney.

No. 748,096. Patented December 29, 1903.

UNITED STATES PATENT OFFICE.

THOMAS PICKLES AND BENJAMIN BLAKEY, OF BURNLEY, ENGLAND.

WEFT-FORK.

SPECIFICATION forming part of Letters Patent No. 748,096, dated December 29, 1903.

Application filed March 6, 1903. Serial No. 146,579. (No model.)

*To all whom it may concern:*

Be it known that we, THOMAS PICKLES and BENJAMIN BLAKEY, subjects of the King of Great Britain, residing at Burnley, in the county of Lancaster, England, have invented a new and useful Improvement Relating to Weft-Forks, (for which we have obtained provisional protection in Great Britain, No. 3,405, bearing date February 13, 1903,) of which the following is a specification.

The improvement relates to the weft-stop mechanism of looms for weaving, and has for its object to relieve the fork of the strain and consequent tendency to damage or disarrangement arising from the shock of stoppage.

In the ordinary weft-fork motion it is well known that the fork, which is mounted so as to be capable of easy movement upon a fulcrum, is formed with a hooked or other engaging back portion which slightly overbalances the fork, but which is raised by the movement of the latter out of the path of the claw-lever at every stroke of the "slay," so long as a weft-thread intervenes between the grid and the fork. When the weft fails, this claw-lever engages with and drags at the hook of the weft-fork with great force in order to release the stopping-handle of the loom, and thereby transmits undesirable strain to the fork and its fulcrum of oscillation, which in course of time seriously affects its proper working, as the said fork is necessarily of delicate construction in order to obtain great susceptibility in action. In other forms of the apparatus the weft-fork is made in two parts, the tine-carrying part being separately pivoted from the claw-lever-engaging part, and both fulcra mounted upon the movable rod or other connection employed to operate the stop-lever; but in all cases a certain amount of shock is imparted to the tine-carrying fulcrum at the moment of drag. To obviate this evil and to carry out our improvement, we divide the weft-fork from the back hook or other engaging portion and mount such back hook upon a fulcrum attached, as heretofore, to the loom-stopping connection. We, however, mount the tines not only upon a separate fulcrum, but upon a fulcrum entirely detached from the remainder of the weft-stop mechanism in such manner that when the claw-lever drags forward the hook the tines will be left behind undisturbed by the shock. This may be effected by pivoting the tines upon a fixed attachment of the loom and enables such tines to be constructed and mounted as lightly and delicately as desired.

In order to more clearly describe means for carrying our invention into effect, reference is made to the accompanying sheet of drawings, in which—

Figures 1 and 2 are respectively a sectional elevation and a plan view of one method of carrying out our invention.

The same letters indicate corresponding parts wherever they occur.

$a$ is the weft-fork, which is pivoted on the pin or fulcrum $b$, while $c$ is the back-hook lever, which is separately pivoted on the pin or fulcrum $d$. The back-hook lever $c$ may be raised upon its fulcrum by the fork in order to effect the ordinary motion in any suitable manner, such as by a projection $e$ upon the fork coming in contact with an extension $h$ of the hook-lever $c$, and the two fulcra may be relatively situated as may be found most convenient. The fulcrum $b$ is shown attached to a bracket $l$ in connection with a fixed part of the loom, so that when the claw-lever engages with the hook-lever $c$ it moves the fulcrum $d$, along with the rod $k$, away from the fork $a$, thus enabling such fork and fulcrum $b$ to be free from any possibility of shock or strain of the kind indicated.

Having now particularly described and ascertained the nature of our said invention and in what manner the same is to be performed, we declare that what we claim is—

A weft-fork composed of a loom-stopping connection $k$; a lever $c$ pivoted on the same, and provided with a hook; an independent fixed bracket $l$; and a fork $a$ pivoted on the said bracket and provided with a projection $e$ to engage and turn the said lever, substantially as described.

THOMAS PICKLES.
BENJAMIN BLAKEY.

Witnesses:
ARTHUR GADD,
GEORGE FREDERICK GADD.